Sept. 10, 1940.          L. H. DARLING          2,214,661
REEL
Filed Jan. 19, 1939          2 Sheets-Sheet 2
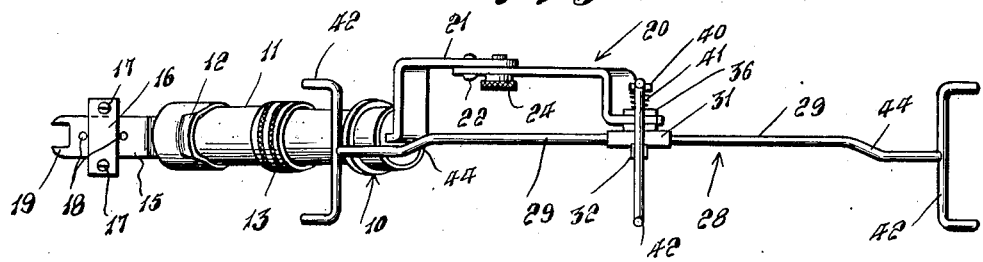
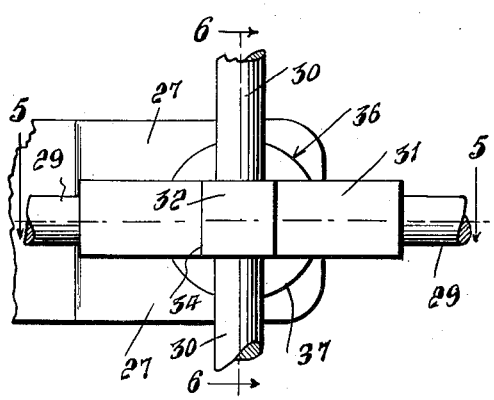
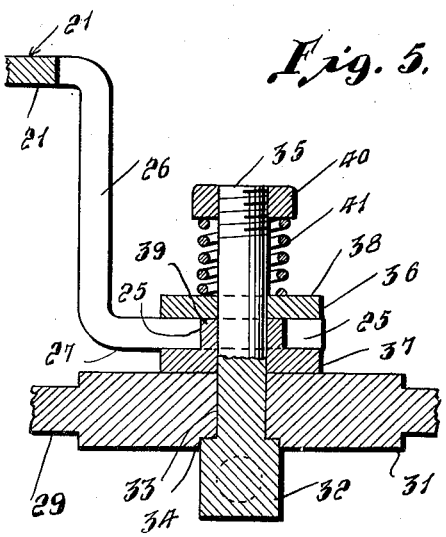
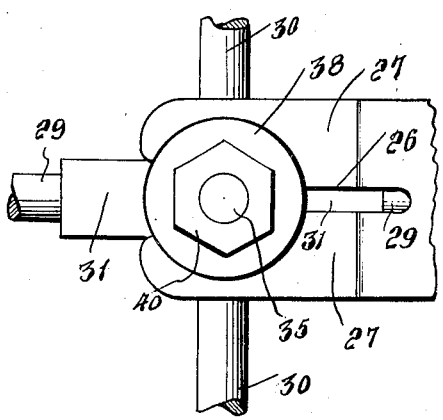
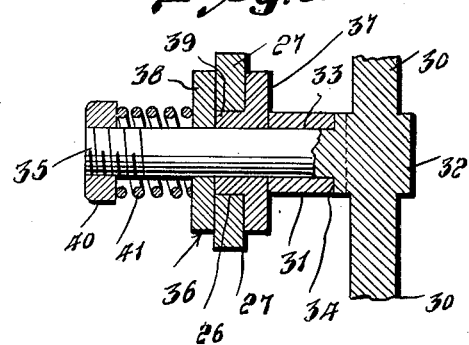
Inventor
*Louis H. Darling*

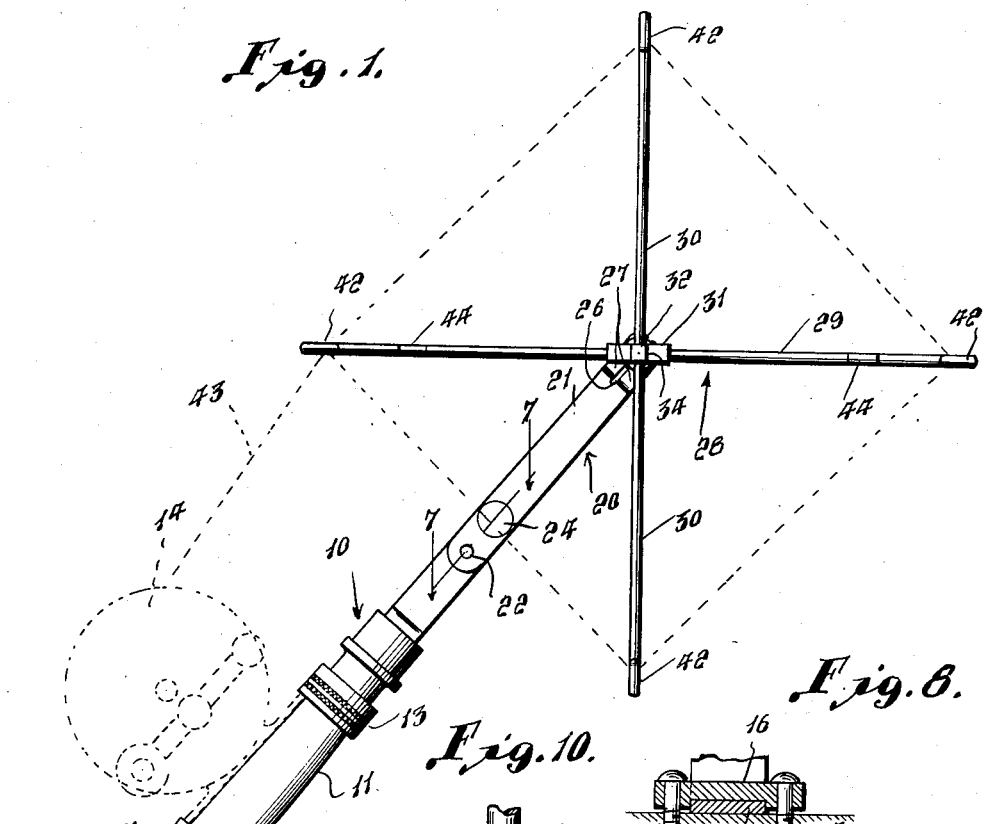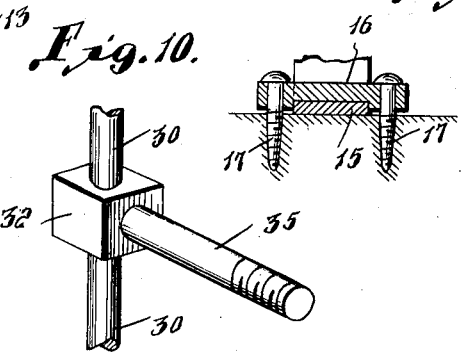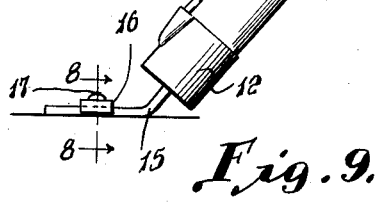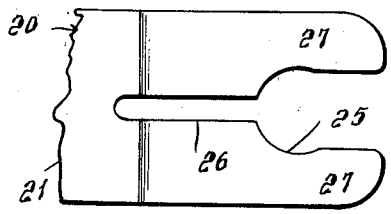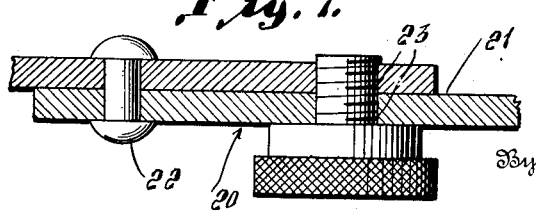

Patented Sept. 10, 1940

2,214,661

UNITED STATES PATENT OFFICE 2,214,661

REEL

Louis H. Darling, Vallejo, Calif.

Application January 19, 1939, Serial No. 251,788

5 Claims. (Cl. 242—115)

This invention relates to an improved drying reel for fishing lines.

It is an aim of this invention to provide an improved collapsible line drying reel of simple construction which may be readily assembled and removably mounted on a supporting member.

Still a further aim of the invention, is to provide improved means for retaining the reel sections in an open position.

Another object of the invention is to provide improved means whereby the reel may be removably mounted and frictionally held on a supporting member, said means not preventing the reel from revolving freely when thus positioned.

Other objects and advantages of the invention will hereinafter become more fully apparent from the following description of the drawings, which illustrate a preferred embodiment thereof, and wherein:

Figure 1 is a side elevational view showing the device fully assembled and mounted on a suitable supporting surface, Figure 2 is a top plan view of the same, Figure 3 is a fragmentary enlarged side elevational view showing the hub portion of the reel in an open position and mounted on its supporting member, Figure 4 is a side elevational view similar to Figure 3, as seen from the opposite side, Figure 5 is a longitudinal sectional view taken along the line 5—5 of Figure 3, Fig. 6 is a transverse sectional view taken along the line 6—6 of Figure 3, Figure 7 is a longitudinal sectional view taken along the line 7—7 of Figure 1, Figure 8 is a vertical sectional view taken along the line 8—8 of Figure 1, Figure 9 is a fragmentary side elevational view showing the end of the supporting member to which the reel is connected, Figure 10 is a perspective view showing the hub portion of one of the reel sections, and Figure 11 is a similar view of the other reel section.

Referring more particularly to the drawings, wherein like reference characters designate like or corresponding parts throughout the different views, 10 designates generally the reel support including the handle portion 11 which is provided with the socket 12 and ring 13 for releasably clamping a fishing reel 14 thereon. The handle portion 11 is tapered toward its forward end so that the ring 13 may be moved relatively thereto to effectively clamp fishing reels 14 of various sizes.

Projecting from the butt end of the handle 11 is a stem 15 having its free end bent to be disposed at an oblique angle to the axis of the handle portion 11. A clamping plate 16, as best seen in Figure 8, is adapted to be secured to a suitable horizontal supporting surface, such as the gunwale of a boat, a wharf or a work bench by the fastening 17 to engage the oblique end portion of the stem 15 for mounting the supporting member 10 at an oblique angle to said supporting surface. If desired, stem 15 can be loosely mounted in the member 16 and can be removably held against movement relatively thereto by means of pins or other fastening positioned in the openings 18 on opposite sides of the member 16 and the free end of the stem may likewise be provided with a notch 19 to engage beneath a headed fastening to prevent the member 16 from being torn from its supporting surface by a downward pressure on the free end of the support 10.

Extending from the forward end of the handle 11 is a shank 20 having an intermediate portion 21 offset relatively to its ends for a purpose which will hereinafter be explained. The shank 20 may be formed of sections which overlap at the intermediate portion 21 and which as seen in Figure 7, are pivotally connected by the rivet 22 so that the sections may be folded relatively to each other. The overlapping portions are likewise provided with the threaded openings 23 spaced from the rivet 22 and adapted to align when the sections are in their extended position to receive the headed screw 24.

The free end of the shank 20 is provided with a notch 25, as best seen in Figure 9, having an enlarged inner end which communicates with the slot 26 to form the resilient forked end 27.

A reel, designated generally 28, includes the arms 29 and 30 provided with the hubs 31 and 32, respectively. Hub 31 is provided with the transverse opening 33 intermediate of its ends and with a transverse notch 34 in one of its sides and which communicates with one end of the opening 33. Hub 32 has a pin 35 projecting from one side thereof and at right angles to the arm 30 to extend through the opening 33 and be loosely mounted therein. The notch 34 is sized to receive the side of the hub 32, from which projects the pin 35, when the arms 29 and 30 are disposed substantially at right angles to each other, as in Figure 3.

A bearing member 36, comprising the washers or disks 37 and 38 and the spacing sleeve 39, which may be formed integral with one of the washers 37 or 38, is loosely mounted on the pin 35 with one side of the washer 37 bearing against the hub 31. The free end of the pin 35 is threaded to receive the nut 40, which tensions the expansion coil spring 41 disposed between said nut and the washer 38.

The free ends of each of the arms 29 and 30 are provided with the forks 42 over which is adapted to be wound a line 43 to dry. The free ends of the arms 29 are offset relatively to the intermediate portion by means of the oblique portions 44 to align the forks of the arms 29 with the forks of the arms 30.

From the foregoing it will be seen, that when the reel is assembled with the bearing member 36, nut 40 and spring 41 mounted on the pin 35, that the spring 41 will tend to project pin 35 so that when the arms 29 and 30 are disposed at right angles to each other the hub 32 will be drawn into seating engagement with the notch 34 to interlock hubs 31 and 32 to retain the reel 28 in an open position. The reel 28 may be collapsed by retracting pin 35 turning hub 32 relatively to hub 31 until arms 29 and 30 are substantially in parallel relationship. Reel 28, either while collapsed or open, may be attached to the support 10 by inserting the sleeve 39 into the notch 25 and when thus disposed the reel can be either opened or collapsed, as heretofore described, and when opened, revolves for winding the line 43 thereon from the reel 14 or conversely for winding the line onto the reel 14 from the reel 28. The offset intermediate portion 21 accommodates the forks 42 and allows the reel 28 to be revolved with forks 42 passing between the ends of the shank 20. As heretofore mentioned, the ends 27 are resiliently disposed relatively to each other so that they may be sprung outwardly to receive the sleeve 39 of bearing 36 which can be removably clamped in the enlarged inner end of the notch 25 to mount the reel 28 on support 10. Washers 37 and 38 may frictionally engage the opposite sides of the forked ends 27, when in this position, or the sleeve 39 may be of sufficient length to space the washers from the opposite sides of the forked ends 27, as desired. In either case, as the bearing 36 is rotatably mounted on pin 35, the pin is free to turn relatively thereto.

It will thus be seen, that the invention embodies an improved fishing line drying reel which may be readily opened or collapsed and so constructed that it can be easily connected to or removed from its supporting member. By forming the shank 20 of pivotally connected sections, the support 10 and reel 28 when folded and collapsed may be readily stored within a relatively small space.

Various modifications and changes are contemplated and may obviously be resorted to and the right is therefore expressly reserved to make such variations and changes as fall within the spirit and scope of the invention as hereinafter defined by the appended claims.

I claim as my invention:

1. A device of the class described comprising supporting means including a shank, the ends of said shank being offset from the intermediate portion thereof, one of said ends being provided with a notch opening outwardly thereof and a longitudinally disposed slot communicating with said notch; a reel formed of arms having enlarged intermediate portions forming hubs, one of said hubs being provided with an opening, a pin projecting from the other hub to extend through said opening, means on said hubs for keying them when positioned at right angles to each other, spring means for normally retaining said arms in a keyed position, and a bearing member carried by said pin to frictionally engage said notch to removably mount the reel on said supporting member.

2. A device as in claim 1, said arms being provided with forked ends, said shank being provided with an intermediate offset portion to accommodate the forked ends when the reel is mounted thereon.

3. A line drying reel comprising a supporting member including a handle portion having means at one end for releasably mounting it on a supporting surface, a shank projecting from the opposite end of said handle portion and provided with a notch at its free end and a longitudinal slot communicating at one end with said notch and dividing the free end into corresponding portions, the portions of the free end of said shank being resiliently disposed relatively to each other for expanding said notch and slot, a collapsible reel formed of sections, movable relatively to each other, for expanding or collapsing the reel, and provided with means for keying said sections in X'd relationship to each other, a bolt projecting from said reel, and a bearing member rotatably mounted on said bolt and frictionally mounted in said notch for rotatably mounting the reel relatively to the shank.

4. A collapsible line drying reel comprising a pair of arms provided with forked ends and enlarged centrally disposed hubs, one of said hubs being provided with an opening, a pin projecting from the other hub through said opening, means on said hubs for interlocking them when in crossed relationship, a bearing member rotatably mounted on said pin and including washers held in spaced relationship by a sleeve, a supporting member having a notched end to frictionally engage said bearing member for rotatably mounting the reel, and spring means carried by said pin for projecting it to retain said hubs in interlocking engagement.

5. A line drying reel comprising a pair of sections, one of said sections being provided with an opening intermediate of its ends, a pin projecting from the other section and extending through said opening, said sections being provided with means for interlocking them in crossed relationship, spring means carried by the free end of said pin for projecting it to normally retain said sections in interlocking engagement, a bearing member loosely mounted on said pin between said sections and spring means, and a support having a notched end in which said bearing member is frictionally and removably mounted, said support comprising a shank formed of pivotally connected sections, each movable relatively to the other, for the purpose of extending or folding the support, and means for retaining said sections in an extended position.

LOUIS H. DARLING.